United States Patent
Souers

(10) Patent No.: US 11,725,718 B1
(45) Date of Patent: Aug. 15, 2023

(54) TORQUE CONVERTER WITH TURBINE POST

(71) Applicant: Schaeffler Technologies AG & Co. KG, Herzogenaurach (DE)

(72) Inventor: Long Souers, North Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/883,663

(22) Filed: Aug. 9, 2022

(51) Int. Cl.
*F16H 45/02* (2006.01)
*F16H 41/24* (2006.01)

(52) U.S. Cl.
CPC ....... *F16H 45/02* (2013.01); *F16H 2041/246* (2013.01); *F16H 2045/0231* (2013.01); *F16H 2045/0247* (2013.01); *F16H 2045/0294* (2013.01)

(58) Field of Classification Search
CPC .............. F16H 41/24; F16H 2041/246; F16H 2045/0226–0231; F16H 2045/0247
See application file for complete search history.

(56) References Cited

U.S. PATENT DOCUMENTS

| | | | | |
|---|---|---|---|---|
| 5,533,602 A | * | 7/1996 | Worner | B23K 20/129 228/114.5 |
| 7,077,253 B2 | * | 7/2006 | Maienschein | F16H 45/02 192/3.3 |
| 7,318,676 B2 | * | 1/2008 | Fugel | F16C 19/30 384/620 |
| 7,762,065 B2 | * | 7/2010 | Ochi | F16H 41/24 60/341 |
| 8,403,762 B2 | * | 3/2013 | Steinberger | F16F 15/13492 192/3.29 |
| 8,720,658 B2 | * | 5/2014 | Ito | F16H 45/02 74/574.2 |
| 10,054,172 B2 | * | 8/2018 | Norwich | F16H 41/24 |
| 10,428,921 B2 | | 10/2019 | Subotic | |
| 2016/0252170 A1 | * | 9/2016 | Lindemann | F04D 29/18 415/122.1 |

* cited by examiner

*Primary Examiner* — Ernesto A Suarez
*Assistant Examiner* — James J Taylor, II

(57) ABSTRACT

A torque converter includes a front cover configured to receive a torque. The torque converter further includes an impeller having an impeller shell non-rotatably connected to the front cover. The torque converter further includes a turbine in fluid communication with the impeller and including a turbine shell. The torque converter further includes a stator disposed axially between the impeller and the turbine. The torque converter further includes a one-way clutch disposed within the stator. The torque converter further includes a side plate axially disposed between the one-way clutch and the turbine shell. The side plate is configured to retain the one-way clutch within the stator. The turbine shell includes a post configured to axially constrain the side plate.

11 Claims, 4 Drawing Sheets

TORQUE CONVERTER WITH TURBINE POST

TECHNICAL FIELD

The present disclosure relates to a torque converter for a vehicle. In particular, the torque converter is provided with a turbine having a post on a turbine shell to axially position a one-way clutch.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a cover of the torque converter to bypass the fluid coupling. In some torque converter arrangements, the torque converter may include a side plate configured to retain a one-way clutch within a stator and a washer, or some other component, arranged between a turbine shell and the side plate to axially constrain the side plate.

SUMMARY

Embodiments of the present disclosure provide a torque converter including a front cover configured to receive a torque. The torque converter further includes an impeller having an impeller shell non-rotatably connected to the front cover. The torque converter further includes a turbine in fluid communication with the impeller and including a turbine shell. The torque converter further includes a stator disposed axially between the impeller and the turbine. The torque converter further includes a one-way clutch disposed within the stator. The torque converter further includes a side plate axially disposed between the one-way clutch and the turbine shell. The side plate is configured to retain the one-way clutch within the stator. The turbine shell includes a post configured to axially constrain the side plate.

In embodiments, the torque converter may include a thrust bearing disposed axially between the stator and the impeller shell. The post may be arranged radially outside of an inner circumference of the thrust bearing. In embodiments, the post may extend circumferentially about a transmission input shaft. In embodiments, the torque converter may include a plurality of posts including the post. The plurality of posts may be spaced from each other circumferentially about a transmission input shaft. Each post may be configured to axially constrain the side plate. The plurality of posts may be circumferentially aligned with each other.

In embodiments, the torque converter may include a damper assembly including an output flange arranged to non-rotatably connect to a transmission input shaft and a cover plate axially disposed between the output flange and the turbine shell. The cover plate may be connected to the output flange and the turbine shell via a connector. The post may be arranged radially outside of the connector. The post may be arranged radially inside of the connector. The torque converter may include a thrust bearing disposed axially between the stator and the impeller shell. The post may be arranged radially outside of an inner circumference of the thrust bearing.

In embodiments, the turbine shell may be arranged to non-rotatably connect to a transmission input shaft. In embodiments, the post may be formed by stamping the turbine shell.

Embodiments of the present disclosure further provide a torque converter including a turbine including a turbine shell. The torque converter further includes a stator axially spaced from the turbine the turbine. The torque converter further includes a one-way clutch disposed within the stator. The torque converter further includes a side plate configured to retain the one-way clutch within the stator. The side plate and the turbine shell define a gap therebetween. The turbine shell includes a post extending across the gap to the side plate.

In embodiments, the torque converter may include a thrust bearing. The one-way clutch may be axially disposed between the thrust bearing and the turbine shell. The post may be arranged radially outside of an inner circumference of the thrust bearing. In embodiments, the post may extend circumferentially about a transmission input shaft. In embodiments, the torque converter may include a plurality of posts including the post. The plurality of posts may be spaced from each other circumferentially about a transmission input shaft. Each post may extend across the gap to the side plate.

In embodiments, the torque converter may include a damper assembly including an output flange arranged to non-rotatably connect to a transmission input shaft and a cover plate axially disposed between the output flange and the turbine shell. The cover plate may be connected to the output flange and the turbine shell via a connector. The post may be arranged radially outside of the connector. The post may be arranged radially inside of the connector. The torque converter may include a thrust bearing disposed axially between the stator and the impeller shell. The post may be arranged radially outside of an inner circumference of the thrust bearing.

In embodiments, the turbine shell may be arranged to non-rotatably connect to a transmission input shaft.

Instead of having a separate component arranged between the turbine shell and the side plate, embodiments described herein include a post on the turbine shell configured to axially constrain the side plate. This allows for removal of separate components for axially constraining the side plate, which can reduce the weight of the torque converter and thereby improve fuel economy.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
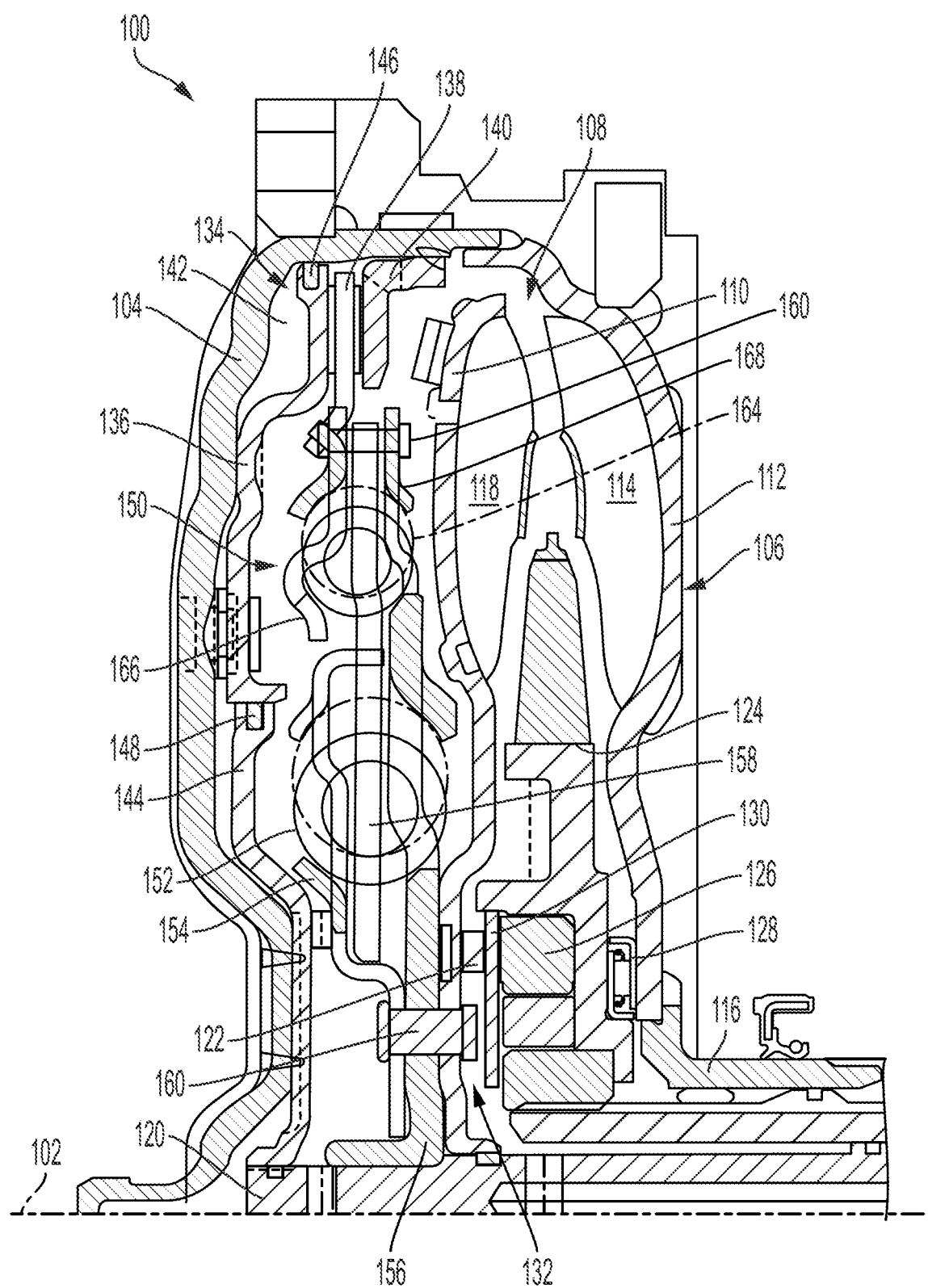
FIG. 1 is a cross-sectional view of a torque converter including a turbine shell having a post axially position a side plate according to an embodiment of the present disclosure.
Figure 2:
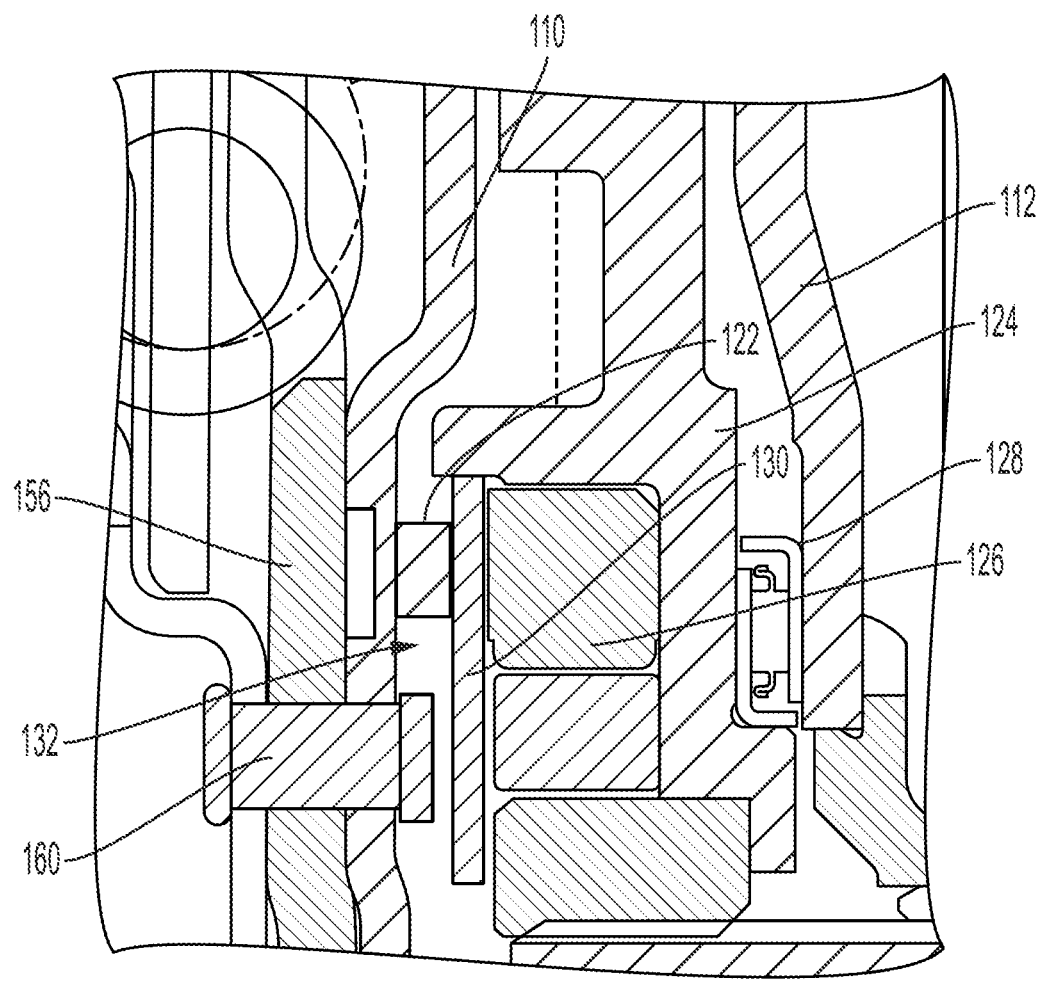
FIG. 2 is an enlarged view of an area of the torque converter shown in FIG. 1.
Figure 3:
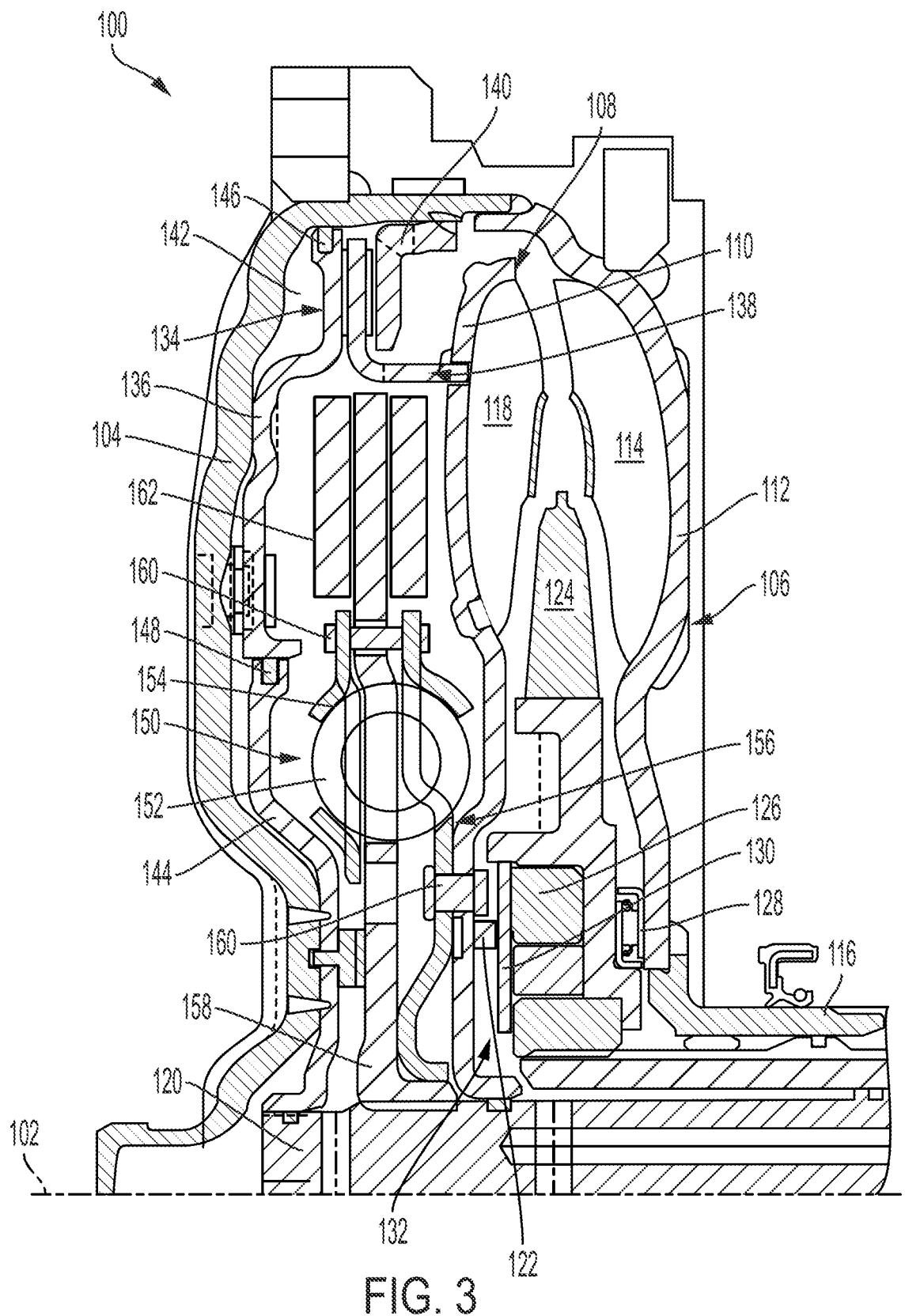
FIG. 3 is a cross-sectional view of a torque converter including a turbine shell having a post axially position a side plate according to another embodiment of the present disclosure.

Referring to FIGS. 1-4, a portion of torque converter 100 is illustrated according to one embodiment of the present disclosure. At least some portions of torque converter 100 are rotatable about central axis 102. While only a portion of torque converter 100 above central axis 102 is shown in FIGS. 1 and 3, it should be understood that torque converter 100 can appear substantially similar below central axis 102 with many components extending about central axis 102. Words such as "axial," "radial," "circumferential," "outward," etc. as used herein are intended to be with respect to central axis 102.

Torque converter 100 includes: front cover 104 arranged to receive torque; impeller 106; turbine 108 in fluid communication with impeller 106 and having turbine shell 110. Impeller 106 includes: impeller shell 112 non-rotatably connected to front cover 104 such that impeller 106 rotates as front cover 104 rotates, at least one impeller blade 114 attached to an inner surface of the impeller shell 112, and impeller hub 116 attached to a radially inner end of impeller shell 112. Turbine 108 includes at least one turbine blade 118 attached to the turbine shell 110. Turbine shell 110 may be non-rotatably connected to transmission input shaft 120 for torque transmission therebetween. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

Turbine shell 110 includes a post 122 extending towards the impeller 106. The post 122 extends from an axial side of the turbine shell 110 facing the impeller 106. The post 122 may be a stamped part. That is, the post 122 may be formed by stamping the turbine shell 110 and then machined for desired surfaces. The turbine shell 110 may include any suitable number of posts 122, e.g., one or more. As one example, the turbine shell 110 may include one post 122 extending circumferentially about the central axis 102. As another example, the turbine shell 110 may include a plurality of posts 122 spaced from each other circumferentially about the central axis 102. In such an example, the plurality of posts 122 may, for example, be circumferentially aligned with each other. As another example, some of the posts 122 may be circumferentially offset relative to the other posts 122.

Torque converter 100 may include: stator 124 disposed axially between impeller 106 and turbine 108 to redirect fluid flowing from turbine blade 118 before the fluid reaches impeller 106 to increase an efficiency of torque converter 100. For example, impeller blade 114, when rotated about central axis 102, pushes the fluid outwardly. The fluid pushes against turbine 108 of torque converter 100, causing turbine 108 to revolve about central axis 102. Stator 124 functions to return the fluid from turbine 108 back to impeller 106 with minimal or no power loss. Drive power is transmitted from turbine 108 to transmission input shaft 120. Torque converter 100 may, for example, further include: one-way clutch 126 disposed within stator 124, thrust bearing 128 disposed axially between stator 124 and impeller shell 112, and side plate 130 configured to retain the one-way clutch 126 within the stator 124.

The torque converter 100 includes a gap 132 between the turbine shell 110 and the side plate 130. The gap 132 extends axially from the turbine shell 110 to the side plate 130. The post 122 is configured to axially constrain the side plate 130. That is, the post 122 extends axially across the gap 132 and contacts the side plate 130. Said differently, the post 122 axially positions the one-way clutch 126 and/or thrust bearing 128. The post 122 may be arranged, i.e., contact the side plate 130, radially outside of an inner circumference of the thrust bearing 128.

The torque converter 100 may include a lock-up clutch 134. Power from a vehicle engine (not shown) can be transmitted to a transmission via fluid, and via the torque converter. In particular, the power may first be transmitted to front cover 104 of torque converter 100. Lock-up clutch 134 is configured to selectively transfer torque from front cover 104 to transmission input shaft 120. Lock-up clutch 134 may include piston 136, clutch plate 138, and reaction plate 140.

Piston 136 may be connected to front cover 104 via a leaf-spring connection and sealed to front cover 104 at an outer diameter thereof. Reaction plate 140 may be fixed to front cover 104 via a weld for example. Clutch plate 138 may be disposed between piston 136 and reaction plate 140. Clutch plate 138 may further be connected to turbine shell 110 at one end, for example, via a tabbed connection.

Piston 136 engages or closes lock-up clutch 134 in response to the pressurization of a medium (e.g., fluid such as oil) in piston apply chamber 142 defined between front cover 104 and piston 136. During axial movement of piston 136, piston 136 slides along seal plate 144. Piston 136 is sealed at an outer diameter to front cover 104 via seal 146 and sealed at an inner diameter to cover centering or seal plate 144 via seal 148. Seals 146, 148 maintain a fluid separation between piston apply chamber 142 and the rest of torque converter 100. Piston apply chamber 142 is further defined by, or bounded between, front cover 104, seal 146, piston 136, seal 148, and seal plate 144. By "bounded in part," we mean that a portion of the cited chamber, flow path, or other structure is bounded, or formed, by the cited element.

Figure 4:
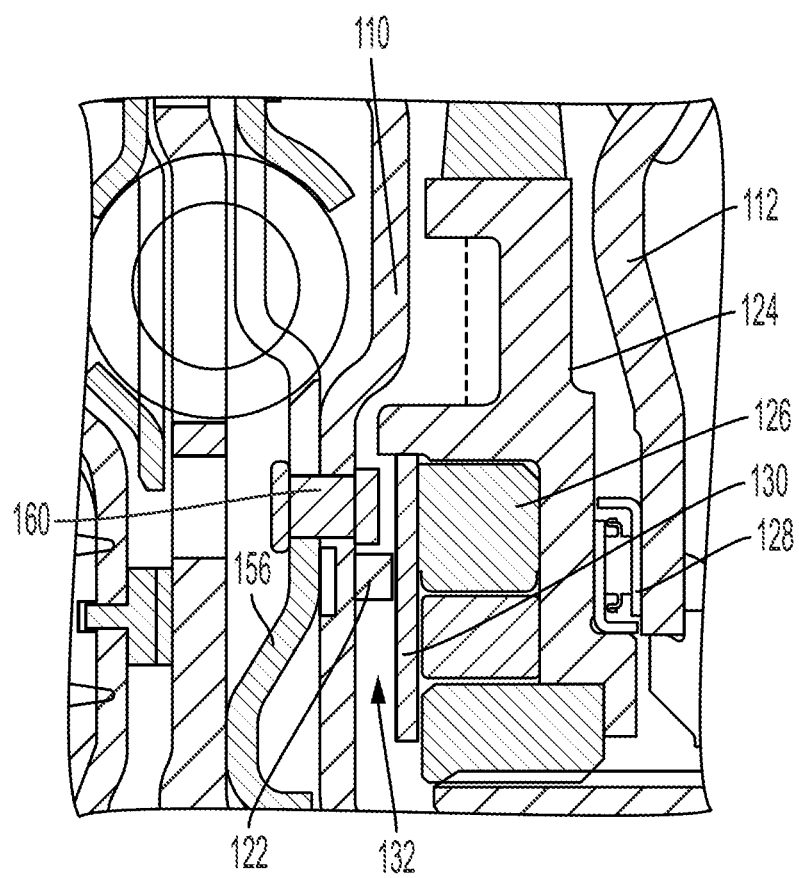
FIG. 4 is an enlarged view of an area of the torque converter shown in FIG. 3.

Torque converter 100 may include damper assembly 150 for hydraulically transferring torque through torque converter 100. Damper assembly 150 is positioned axially between front cover 104 and turbine 108 and is configured to transfer torque from front cover 104 to transmission input shaft 120. Damper assembly 150 includes: springs 152; cover plates 154, 156; and flange 158. Cover plate 156 may support springs 152 on one axial side. Cover plate 156 may support springs 152 on another, opposite axial side. Cover plates 154, 156 may be connected to each other and flange 158, for example, via a rivet, radially outward of springs 152. Cover plate 156 may further be connected to turbine shell 110 via a connector 160, for example, a rivet. The post 122 may, for example, be disposed radially outward of the connector 160, as shown in FIGS. 1-2. As another example, the post 122 may be disposed radially inward of the connector 160, as shown in FIGS. 3-4.

Torque converter 100 may include outer springs 164 arranged radially outside of the springs 152 and cover plates 166, 168 supporting the outer springs 164, as shown in FIG. 1. Additionally, or alternatively, torque converter 100 may include centrifugal pendulum absorber 162 connected to flange 158, as shown in FIG. 3. Flange 158 is connected to transmission input shaft 120 for torque transmission therebetween.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Torque converter
102 Central axis
104 Front cover
106 Impeller
108 Turbine
110 Turbine shell
112 Impeller shell
14 Impeller blade
16 Impeller hub
118 Turbine blade
120 Transmission input shaft
122 Post
24 Stator
126 One-way clutch
128 Thrust bearing
130 Side plate
132 Gap
134 Lock-up clutch
136 Piston
138 Clutch plate
140 Reaction plate
142 Piston apply chamber
144 Seal plate
146 Seal
148 Seal
50 Damper assembly
52 Springs
154 Cover plate
156 Cover plate
158 Flange
60 Connector
162 Centrifugal pendulum absorber
164 Outer springs
166 Cover plate
168 Cover plate

What is claimed is:

1. A torque converter comprising:
a front cover configured to receive a torque;
an impeller having an impeller shell non-rotatably connected to the front cover;
a turbine in fluid communication with the impeller and including a turbine shell, the turbine shell including a radially inner end arranged to non-rotatably connect to a transmission input shaft;
a stator disposed axially between the impeller and the turbine;
a one-way clutch disposed within the stator;
a side plate axially disposed between the one-way clutch and the turbine shell, the side plate being configured to retain the one-way clutch within the stator; and
a damper assembly including a cover plate connected to the turbine shell via a connector;
wherein the turbine shell includes a post spaced from the radially inner end and contacting the side plate, the post being radially aligned with the connector and configured to axially constrain the side plate;
wherein the post is formed by stamping the turbine shell.

2. The torque converter of claim 1, further comprising a thrust bearing disposed axially between the stator and the impeller shell, wherein the post is arranged radially outside of an inner circumference of the thrust bearing.

3. The torque converter of claim 1, wherein the post extends circumferentially about the transmission input shaft.

4. The torque converter of claim 1, wherein the torque converter includes a plurality of posts including the post, the plurality of posts being spaced from each other circumferentially about the transmission input shaft, and wherein each post is configured to axially constrain the side plate.

5. The torque converter of claim 4, wherein the plurality of posts are circumferentially aligned with each other.

6. The torque converter of claim 1, wherein the post is arranged radially outside of the connector.

7. A torque converter comprising:
a turbine including a turbine shell, the turbine shell including a radially inner end arranged to non-rotatably connect to a transmission input shaft;
a stator axially spaced from the turbine;
a one-way clutch disposed within the stator;
a side plate configured to retain the one-way clutch within the stator, the side plate and the turbine shell defining a gap therebetween; and
a damper assembly including a cover plate connected to the turbine shell via a connector;
wherein the turbine shell includes a post spaced from the radially inner end and extending across the gap to the side plate, the post being radially aligned with the connector;
wherein the post is arranged radially outside of the connector.

8. The torque converter of claim 7, further comprising a thrust bearing, the one-way clutch being axially disposed between the thrust bearing and the turbine shell, wherein the post is arranged radially outside of an inner circumference of the thrust bearing.

9. The torque converter of claim 7, wherein the post extends circumferentially about the transmission input shaft.

10. The torque converter of claim 7, wherein the torque converter includes a plurality of posts including the post, the plurality of posts being spaced from each other circumferentially about the transmission input shaft, and wherein each post extends across the gap to the side plate.

11. A torque converter comprising:
- a front cover configured to receive a torque;
- an impeller having an impeller shell non-rotatably connected to the front cover;
- a turbine in fluid communication with the impeller and including a turbine shell;
- a stator disposed axially between the impeller and the turbine;
- a one-way clutch disposed within the stator;
- a side plate axially disposed between the one-way clutch and the turbine shell, the side plate being configured to retain the one-way clutch within the stator; and
- a damper assembly including a cover plate connected to the turbine shell via a connector;
- wherein the turbine shell includes a post configured to axially constrain the side plate, the post being arranged radially outside of the connector.

* * * * *